United States Patent [19]

Nasrallah et al.

[11] Patent Number: 5,102,682
[45] Date of Patent: Apr. 7, 1992

[54] SUCROSE AND FRUCTOSE-CONTAINING FOOD MIX AND PROCESS

[75] Inventors: Maurice Nasrallah; Antonia B. Nasrallah, both of Tarrytown; Fouad Z. Saleeb, Pleasantville, all of N.Y.

[73] Assignee: Kraft General Foods, Inc., Glenview, Ill.

[21] Appl. No.: 648,082

[22] Filed: Jan. 31, 1991

[51] Int. Cl.$^5$ ................................ A23L 2/38
[52] U.S. Cl. .................... 426/590; 426/658
[58] Field of Search ............ 426/591, 555, 554, 590, 426/558, 285

[56] References Cited

U.S. PATENT DOCUMENTS

| | | | |
|---|---|---|---|
| H847 | 11/1990 | White | 426/590 |
| H859 | 12/1990 | Augustine | 426/599 |
| 4,199,610 | 4/1980 | Hughes | 426/590 |
| 4,278,695 | 7/1981 | Velasco et al. | 426/289 |
| 4,303,684 | 12/1981 | Pitchon | 426/658 |
| 4,343,819 | 8/1982 | Wood et al. | 426/96 |
| 4,541,873 | 9/1985 | Schenz et al. | 127/46.1 |
| 4,664,920 | 5/1987 | Saleeb et al. | 426/74 |
| 4,698,101 | 10/1987 | Kowarinta | 426/285 |
| 4,737,368 | 4/1988 | Batterman | 426/576 |
| 4,752,484 | 6/1988 | Pflaumer | 426/549 |
| 4,772,482 | 9/1988 | Olinger | 426/549 |
| 4,859,477 | 8/1989 | Augustine | 426/620 |
| 4,913,921 | 4/1990 | Schroeder | 426/602 |
| 4,963,380 | 10/1990 | Schroeder | 426/602 |

Primary Examiner—Carolyn Paden
Attorney, Agent, or Firm—Thomas R. Savoie

[57] ABSTRACT

A sucrose and fructose-containing dry food mix and method of manufacture is disclosed. The fructose is crystalline fructose having less than 10% of its particles smaller than 150 microns, a flavor having a low water activity particularly spray dried in a modified starch and malto-dextrin matrix and an acidic or neutral anti-caking agent. The food mix does not cake over an extended period of time.

16 Claims, No Drawings

SUCROSE AND FRUCTOSE-CONTAINING FOOD MIX AND PROCESS

This invention relates to an improved, dry, food mix containing sucrose and fructose and a method for its preparation.

Dry beverage mixes containing sweetener, food acid, flavor and flow agent are well known. Generally, the primary sweetener in beverages has been sucrose, glucose or artificial sweeteners.

While sucrose is effective to sweeten foods, nutritional reasons have recently inspired a reduction in the sucrose and/or total sugars content of some presweetened foods, especially beverages. To provide traditional levels of sweetness at reduced weight concentrations, sweeteners having more sweetening power per unit weight than sucrose (i.e., having higher relative sweetness) must be employed. While certain high potency non-nutritive or "artificial" sweeteners have been suggested for use, both current food regulations and strong consumer prejudice against artificial sweeteners have directed art attempts at providing presweetened beverage mixes employing only nutritive, carbohydrate sweetening agents.

Since fructose is 10-17% sweeter than sucrose on an absolute basis and about 30% sweeter than sucrose in a 50/50 mixture, many attempts have been to employ fructose as a sweetening agent for some foods. Fructose is commercially available in basically two forms, (1) high fructose corn syrup, (hereinafter "HFCS") normally a liquid, and (2) crystalline fructose which is a solid powder.

HFCS has the advantage of being relatively inexpensive compared to crystalline fructose and has been employed by soft drink manufactures to reduce cost of their carbonated beverages. Use of HFCS as a major component for presweetened dry beverages is not practical since the 20% moisture content of the HFCS makes a sticky, caked, dry food mix.

Another problem with HFCS is that it is not as sweet as crystalline fructose. Fructose exists mostly in four forms as the alpha-furano, beta-furano, alpha-pyrano and beta-pyrano structures. The sweetness perception of fructose is, however, primarily a function of the amount of beta-pyrano form. Crystalline fructose, is usually manufactured as theoretically-pure, anhydrous beta-D-fructopyranose for this reason (although typical analysis indiate only 97.2% beta-pyranose). HFCS, on the other hand, is not as sweet as pure crystalline fructose since it is an amorphous mixture of these non-sweet fructose forms as well as the sweet form. HFCS also contains glucose which is less sweet than fructose. HFCS comprises only about 57-70% of the sweet beta-pyrano form (basis on total fructose). Therefore, crystalline fructose is substantially sweeter on a unit weight basis than HFCS (dry basis).

Use of crystalline fructose, while having more intense sweetness, does not overcome the hygroscopic nature of fructose mixtures. In addition crystalline fructose is more expensive than sucrose, but less is needed which helps lower cost.

The prior art contains many example of dry food mixes containing monosaccharides, acids, flavor and anti-caking agents.

U.S. Pat. No. 4,199,610 entitled "Non-hydroscopic Dry Instant Beverage Mixes" issued Apr. 22, 1980 to Hughes et al., teaches the preparation of a dry, stable, acidulated beverage mix made by adding phosphoric acid to pulverized (instead of granular) sugar, preferably pulverized fructose sugar, with particles from 1-100 microns, then drying the phosphoric acid mixture and grinding the dry cake.

U.S. Pat. No. 4,664,920 entitled "Method for Fixing Food Ingredients on a Magnesium Salt Substrate" issued May 12, 1987 to Saleeb et al.; used magnesium salts to fix juice solids, flavors, colors and high fructose corn syrup.

U.S. Pat. No. 4,541,873 entitled "Method and Manufacture for easily Spray Drying Low Molecular Weight Sugars" to Schenz et al., issued Sept. 17, 1985; teaches a method of complexing saccharides, including fructose, with metallic cations to improve resistance to humidity and improve flowability.

Another quick dissolving beverage is discussed in U.S. Pat. No. 4,343,819 entitled "Quick-Dissolving Powdered Drink and Method Therefore" issued Aug. 10, 1982 to Wood et al., describes a dry beverage mix having carbonates bound to sucrose particles.

In U.S. Pat. No. 4,273,695 entitled "Preparing Beverage Mix Containing Dextrose, Hydrate and Coated Citric Acid", a free-flowing beverage mix is prepared by coating particles of food acid with a desicating agent such as silicon dioxide and then mixing the coated particles with a saccharide material.

Many of the previously mentioned prior art techniques employ special crystallization or drying techniques. It has not hereto been possible to produce a non-caking, fructose-containing beverage mix having a high proportion of fructose using commonly-available food ingredients and simple mixing techniques.

SUMMARY OF THE INVENTION

The present invention relates to dry food mixes containing sucrose and fructose. The fructose is present as at least about 10% of the mix and has been processed to insure that no more than 10% of its weight is comprised of particles smaller than 150 microns, preferably no more than 5% of its weight and most preferably no more than 2% of its weight, is comprised of particles smaller than 100 microns in size. As an additional essential feature of this invention all flavors which are combined with the fructose mix have been selected to have a low water activity (i.e., 0.4 or less), most preferably one which approximates that of the crystalline ingredients of the mix. When spray dried flavor is employed, it is fixed in a matrix containing modified starch in order to maintain its water activity at or below 0.4. Anti-caking or flow agents are also employed to prevent fructose particles from fusing together. For fructose levels significantly higher than about 14% of the mix, the anti-caking agents are preferably neutral or acidic to prevent caking that could be caused by reaction of basic anti-caking agents, such as magnesium oxide or calcium silicate, and fructose. Where basic anti-caking agents are employed they must be pre-mixed with at least a portion of the acid employed in the food mix and the acid content of the mix must be 3.0% by weight or greater.

While each of the modified ingredients helps prevent caking, all contribute together to yield a shelf-stable, non-caking, fructose-containing dry food mix particularly useful as a beverage mix. All percents recited herein are weight percents.

DESCRIPTION OF THE INVENTION

The present invention is directed to a stable, dry food mix which contains sucrose, fructose having less than 10% of its particles 150 microns or smaller, a crystallized food acid, flavors having water activity at or below 0.4, as measured at 90° F., and anti-caking agents which are neutral or acidic or have been mixed with acid to balance any alkalinity and to prevent or reduce reaction with the fructose. While each of the modifications made to the dry mix will individually reduce caking caused by the fructose, the combinations of fructose particles size, control of flavor water activity and use of neutral or acid anti-caking agents together give a dry food mix which will remain flowable for months under normal conditions of sale and use by the consumer. Anti-caking agents which are neutral or acidic are calcium citrate, calcium fumarate, tricalcium phosphate and silicon dioxide.

We employ crystalline fructose which has been prepared to remove most fructose (less than 10%) particles smaller than 150 microns. By removing these fine particles the coarse fructose particles are less likely to hydrate and stick to each other since fewer particles are spaced further apart in the food mix. Particle size control can be facilitated during manufacture and/or the fructose screened prior to use. Once the desired coarse fructose has been obtained, further abuse of the material or resulting mix should be minimized.

The fructose is screened, or otherwise modified to insure that it contains less than 10%, preferably less than 8%, particles smaller than 150 microns and usually less than 5%, preferably less than 2%, of the particles smaller than 100 microns. Crystalline sweeteners such as sucrose or crystalline fructose which have low water activity should be used. The fructose and sucrose content of the mix can range from 10–60% and 20–80% by weight respectively. The combined weight or fructose and sucrose will usually be at least about 40% and for soft drink mixes, such as fruit-flavored beverage mixes, will typically be at least 90%, usually about 95% or more, of the mix.

We also employ crystallized food acids of equally low water activity to reduce the amount of water introduced into the dry food mix. Suitable acids include citric, malic, tartaric, fumaric, adipic and their like. From 0.5% to 10% food acid is employed. Where basic anti-caking agents are employed we try to mix the anti-caking agent with the food acid and use levels of acid above 3% by weight of the mix to reduce the likelihood of reaction between the alkaline anti-caking agent and the fructose.

The food flavor can be any, suitable flavor provided the water activity is maintained at or below 0.4, preferably at or below 0.36, measured at 90° F. Some flavors can have a water activity approaching the crystalline sugars and acid employed in the mix.

Spray dried flavors, normally fixed in malto-dextrin must be modified to reduce their water activity. We have found that 20–80% of a modified starch may replace a similar amount of malto-dextrin to produce suitable flavors having low water activity. A typical spray-dried flavor for use in this invention contains 30–60% modified food starch having a molecular weight in excess of 2,000, 30–60% malto-dextrin and flavorant.

A typical fixed flavor can be about 40% chemically modified food starch, about 40% malto-dextrin and about 20% lemon oil is mixed with 40% "N-LOC" modified starch manufactured by National Starch and 40% "LODEX" hydrolyzed corn syrup supplied by Amaizo, American Maize Products, Hammond, Ind. When mixed in an aqueous suspension or solution and spray dried there is produced a lemon flavor with a water activity below 0.36, most preferably below 0.34.

A dry mix composition may be prepared in the following manner. Minor ingredients such as vitamins, colors, buffers, sweetness enhancers and the anti-caking agent are added to the acid already placed in a ribbon mixer. The premix is blended for 20 minutes or more to obtain a uniform blend. Each ingredient is fed separately into the blender through a coarse screen which is used to distribute the material onto the surface of the acid.

The premix is then added with the major ingredients of sucrose and fructose and flavor, using Merrick TM Scale Feeders, to a continuous mixing screw where the ingredients are homogeneously blended without excessive handling which would produce fines. The dry mix is stored in large containers and transported, when needed, to packaging. Rough treatment of the prepared mix is avoided and the temperature and humidity of the ambient atmosphere are controlled to reduce exposure of the mix to moisture. The mix is packaged in depending on the product and its serving size.

The following examples which set forth several non-caking beverage mix formulations are intended to illustrate various embodiments of the invention but are not intended to limit the invention in any way.

|  | Example No. | | | | | |
|---|---|---|---|---|---|---|
|  | 1 | 2 | 3 | 4 | 5 | 6 |
|  | Flavor | | | | | |
| Ingredients (wt. %) | Lemonade | Orange | Punch | Grape | Lemon | Cherry |
| Crystalline Sucrose | 77 | 77 | 81 | 81 | 79 | 81 |
| Coarse Fructose | 14 | 14 | 14 | 16 | 17 | 16 |
| Flavor extruded in amorphous carbohydrate (Aw less than 0.34) | 1 | 1 | — | — | — | — |
| Spray Dried Flavor (Aw less than 0.34) | — | — | 0.6 | 0.28 | 0.32 | 0.4 |
| Crystallized Citric Acid | 6.9 | 5.4 | 3.9 | 2.4 | 3.1 | 2.4 |
| Alkaline Anti-caking Agent | | | | | | |
| Magnesium Oxide | 0.3 | — | 0.2 | — | — | — |
| Calcium Silicate | — | — | 0.09 | — | — | — |
| Neutral or Acidic Anti-caking Agent | | | | | | |

-continued

| Ingredients (wt. %) | Example No. | | | | | |
|---|---|---|---|---|---|---|
| | 1 | 2 | 3 | 4 | 5 | 6 |
| | Flavor | | | | | |
| | Lemonade | Orange | Punch | Grape | Lemon | Cherry |
| Tricalcium phosphate | — | 0.3 | — | 0.3 | 0.3 | 0.3 |
| Tricalcium citrate | — | 0.15 | — | — | — | — |
| Buffer, color vitamins, cloud, flavor and enhancers | trace | trace | trace | trace | trace | trace |

It can be seen that alkaline flow agents can be employed provided the acid level is maintained above 3.0% by weight. The spray dried flavors, which may contain 2-8% moisture, can contribute about one half the water content of the mix, were found to produce non-caking products on storage and use.

What is claimed is:

1. A dry, flavored, sucrose and fructose-containing powdered food mix comprising at least 20% crystalline sucrose, at least 10% crystalline fructose, 1-8% crystallized food acid, flavor and anti-caking agent wherein the crystalline fructose component contains less than 10% by weight of particles smaller than 150 microns and the flavors have a water activity of 0.4 or less at 90° F.

2. The food mix of claim 1 wherein the anti-caking agent is neutral or acidic.

3. The food mix of claim 2 wherein the anti-caking agent is selected from the group consisting of tricalcium phosphate, calcium fumarate, calcium citrate, silicon dioxide and mixtures thereof.

4. The food mix of claim 1 wherein the anti-caking agent is basic and is combined with food acid of about 3% or greater by weight of the mix.

5. The food mix of claim 1 wherein the crystalline fructose contains less than 5% of particles smaller than 100 microns.

6. The food mix of claim 1 wherein the water activity of the flavor is adjusted to be about the same as the sugars and acid employed in the mix.

7. The food mix of claim 1 containing at least 10% to 17% fructose wherein the flavor is spray-dried in a matrix, said matrix containing at least 20% modified food starch having a molecular weight in excess of 2000, at least 30% malto-dextrin and having a moisture content of 2% to 8%.

8. The food mix of claim 7 wherein the matrix contains 20%-80% modified food starch.

9. The food mix of claim 8 wherein the spray-dried flavor contains 30%-60% modified food starch and 30-60% malto-dextrin.

10. The food mix of claim 1 wherein fructose is present at from 10-60% and sucrose is present at from 20-80%.

11. The food mix of claim 1 wherein the mix is a soft drink beverage mix and the combination of sucrose and fructose is at least 90% of the mix.

12. The food mix of claim 1 wherein the water activity of the flavor is 0.36 or less.

13. A method of stabilizing a fructose-containing dry food mix against caking during storage which comprises blending in homogeneous and intimate contact at least 20% crystalline sucrose, at least 10% crystalline fructose having 10% or less of particles smaller than 150 microns, 1 to 8% crystallized food acid, a neutral or acidic anti-caking agent or an alkaline anti-caking agent protected by at least 3% food acid, and a dry flavor, said flavor having a matrix with a water activity of less than 0.36 when measured at 90° F.

14. The method of claim 13 wherein the food mix contains at least 10% to 17% fructose and the flavor is a spray-dried flavor comprising 30% to 60% modified food starch, 30% to 60% malto-dextrin, flavor and having a moisture content of 2% to 8%.

15. The method of claim 13 wherein the fructose is present at from 10-60% and the sucrose is present at from 20-80%.

16. The method of claim 15 wherein the food mix is a soft drink beverage mix and the combination of sucrose and fructose is at least 90% of the mix.

* * * * *